(12) United States Patent
Oishi

(10) Patent No.: US 12,081,707 B2
(45) Date of Patent: Sep. 3, 2024

(54) PRINTER

(71) Applicant: Toshiba Tec Kabushiki Kaisha, Tokyo (JP)

(72) Inventor: Sadatoshi Oishi, Fuji Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 18/322,548

(22) Filed: May 23, 2023

(65) Prior Publication Data

US 2024/0031497 A1    Jan. 25, 2024

(30) Foreign Application Priority Data

Jul. 20, 2022  (JP) .................................. 2022-115792

(51) Int. Cl.
*H04N 1/00* (2006.01)
*H04N 1/32* (2006.01)

(52) U.S. Cl.
CPC ..... *H04N 1/00342* (2013.01); *H04N 1/00591* (2013.01); *H04N 1/32144* (2013.01); *H04N 2201/0027* (2013.01)

(58) Field of Classification Search
None
See application file for complete search history.

(56) References Cited

U.S. PATENT DOCUMENTS

| 2005/0200910 | A1 | 9/2005 | Kanoshima et al. | |
|---|---|---|---|---|
| 2006/0226987 | A1 | 10/2006 | Nagase | |
| 2010/0033738 | A1* | 2/2010 | Miyamoto | H04N 1/00366 358/1.9 |
| 2015/0242172 | A1* | 8/2015 | Murphy | G06F 3/1292 358/1.6 |
| 2020/0257229 | A1* | 8/2020 | Sato | G03G 15/2032 |

* cited by examiner

*Primary Examiner* — Lennin R Rodriguezgonzalez
(74) *Attorney, Agent, or Firm* — Kim & Stewart LLP

(57) ABSTRACT

A printer includes a cassette or tray for storing a sheet to which a wireless tag is attached, a conveyer configured to convey the sheet for printing, a wireless tag reader/writer configured to read and write information from and to the wireless tag when the sheet is conveyed for printing, a scanner, and a controller configured to: control the scanner to read a symbol, determine whether the symbol indicates an identification code that identifies a type of the sheet, upon determining that the symbol indicates the identification code, acquire parameters used for controlling the conveyer or the reader/writer corresponding to the type of the sheet, and control the conveyer and the reader/writer using the parameters when printing is performed on the sheet.

17 Claims, 15 Drawing Sheets

PRINTER

CROSS-REFERENCE TO RELATED APPLICATION(S)

This application is based upon and claims the benefit of priority from Japanese Patent Application No. 2022-115792, filed Jul. 20, 2022, the entire contents of which are incorporated herein by reference.

FIELD

Embodiments described herein relate generally to a printer, a method carried out by a printer, and a non-transitory computer readable medium.

BACKGROUND

Conventionally, a printer for conveying a sheet in a sheet feed cassette or a sheet placed on a manual feed tray and forming images on the sheet has been widely used. Such a printer performs printing according to its sheet type. In recent years, a sheet provided with a wireless tag for storing data is sometimes used. A printer that can print on such a sheet includes a wireless tag communication device for reading and writing information from and to the wireless tag, and prints on the sheet and reads and writes information from and to the wireless tag. The wireless tag communication device communicates with the wireless tag of the print target sheet, and reads and writes data from and to the wireless tag.

Here, if the wireless tag communication device communicates with another sheet in the printer, communication with the wireless tag attached to the sheet to be printed cannot be performed. For this reason, the printer needs various settings corresponding to types of the sheet in order to communicate with only the wireless tag of the sheet to be printed. The various settings are performed manually by a user or automatically by calibration using the first sheet after refilling.

However, if various settings are manually made, it is troublesome for the user, and if calibration is performed, one sheet is wasted. Therefore, various settings corresponding to types of the sheet provided with the wireless tag cannot be efficiently performed in some cases.

SUMMARY OF THE INVENTION

Embodiments of the present invention provide a printer capable of efficiently performing various settings according to a type of a sheet including a wireless tag.

A printer comprises a cassette or tray for storing a sheet to which a wireless tag is attached, a conveyer configured to convey the sheet for printing, a wireless tag reader/writer configured to read and write information from and to the wireless tag when the sheet is conveyed for printing, a scanner, and a controller. The controller is configured to: control the scanner to read a symbol, determine whether the symbol indicates an identification code that identifies a type of the sheet, upon determining that the symbol indicates the identification code, acquire parameters used for controlling the conveyer or the reader/writer corresponding to the type of the sheet, and control the conveyer and the reader/writer using the parameters when printing is performed on the sheet.

DETAILED DESCRIPTION

Figure 1:
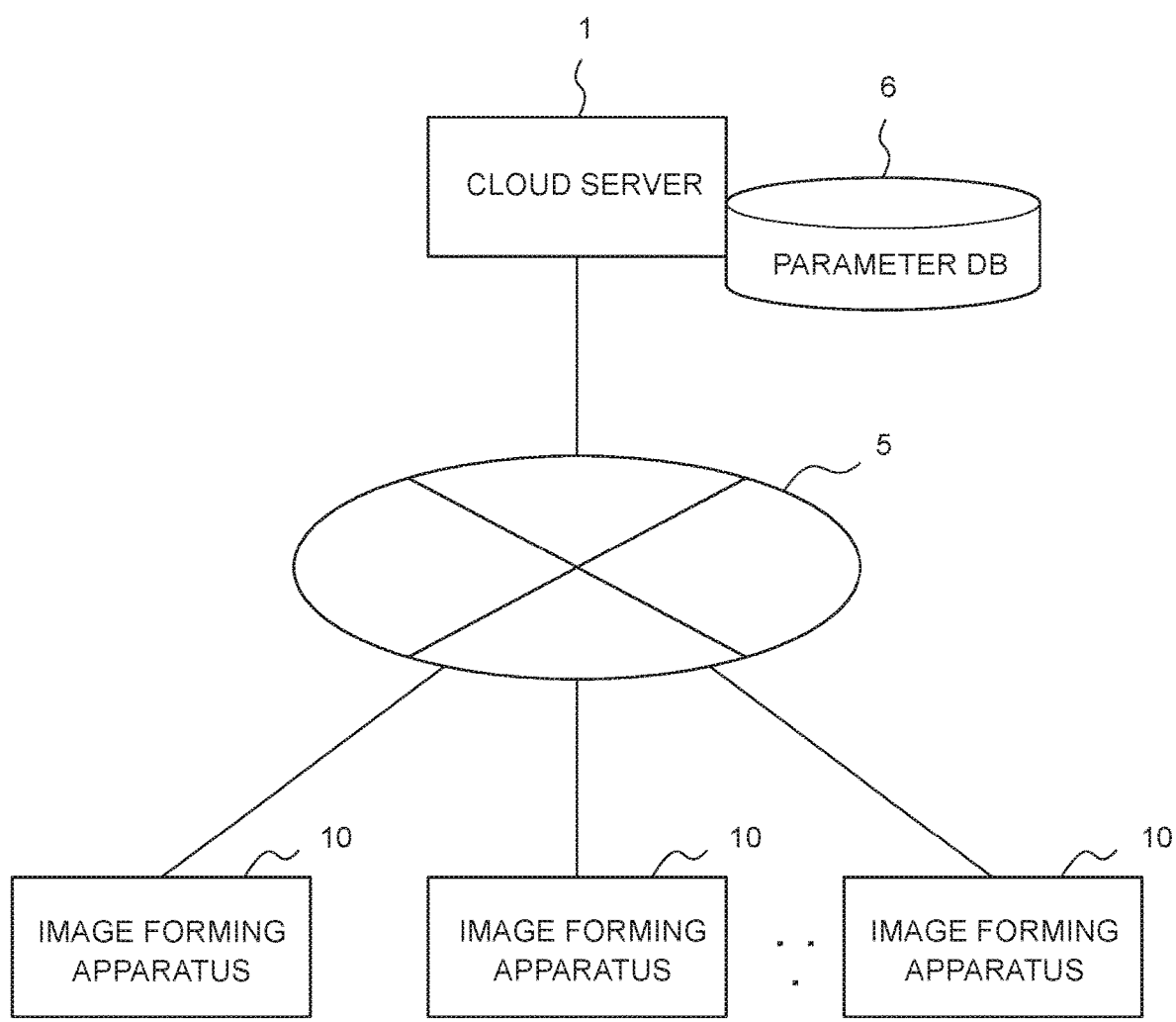
FIG. 1 is a network configuration diagram of a parameter setting system according to a first embodiment.

Hereinafter, embodiments will be described in detail with reference to the drawings. The present invention is not limited to the embodiments described below.

Hereinafter, a printer and a program according to an embodiment will be described referring to the drawings. The printer of the embodiment can efficiently set various parameters according to type of the sheet including wireless tag. The present invention relates to an image-forming device including a printer and a parameter setting method. In the following description, components having the same or similar functions are denoted by the same reference numerals. In addition, the description of the overlapping configuration may be omitted. Hereinafter, first and second embodiments of the printer will be described.

First Embodiment (System Configuration of Parameter Setting St)

First, the configuration of a parameter setting system St according to a first embodiment will be described with reference to FIG. 1.

FIG. 1 is an explanatory diagram of a network configuration of the parameter setting system St according to the first embodiment. As illustrated in FIG. 1, the parameter setting system St includes a cloud server 1 and one or more image forming apparatuses 10. Each device is communicably connected via a network 5. The devices are computer devices including a Central Processing Unit (CPU), memories (Read Only Memory (ROM), Random Access Memory (RAM), and the like), and a communication unit.

The cloud server 1 includes a parameter database (DB) 6 (see FIG. 12) and manages information required for various settings in the image forming apparatus 10. The image forming apparatus 10 is a multifunction peripheral (MFP) used in an office, a factory, a store, or the like. Specifically, the image forming apparatus 10 includes various functions such as copying, FAX, scanning, and printing. Note that although the plurality of image forming apparatuses 10 are illustrated in the figure, a single apparatus may be used.

(Example of Entire Configuration of the Image Forming Apparatus 10)

Figure 2:
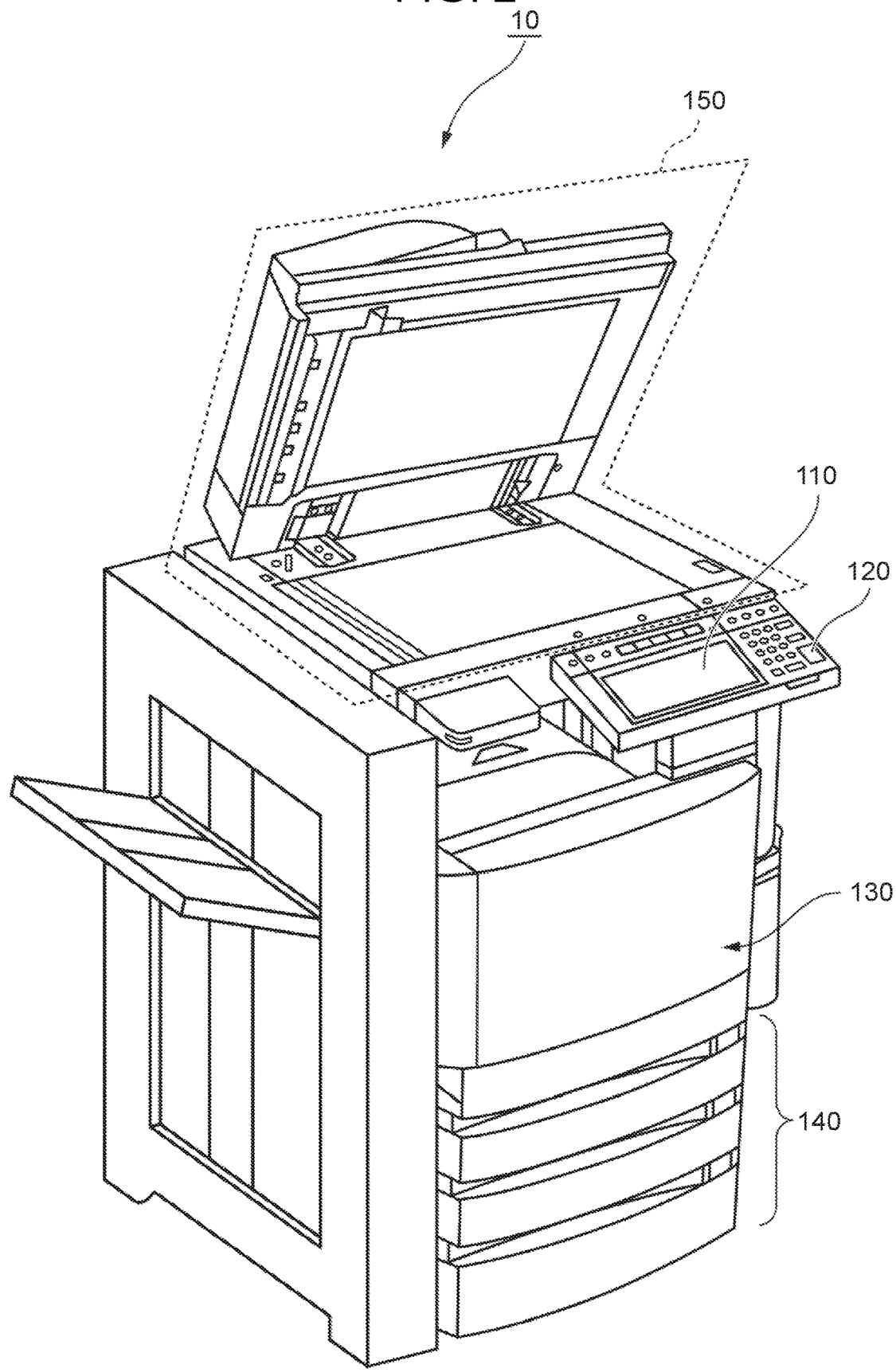
FIG. 2 is an external view of an image forming apparatus in the parameter setting system.

FIG. 2 is an external view of the image forming apparatus 10 according to the first embodiment. The image forming apparatus 10 includes a display 110, a control panel 120, a printer 130, a sheet storage unit 140, and an image reading unit 150.

The display 110 is, for example, a touch panel type liquid crystal display. The display 110 displays various types of information. The display 110 receives an operation from a user. The display 110 outputs an operation signal corresponding to various input operations received from the user.

The control panel 120 includes various operation keys such as a numeric keypad and a start key. The control panel 120 receives various input operations from a user. The control panel 120 outputs an operation signal corresponding to various input operations received from the user.

The printer 130 performs a series of print operations using various types of data output from the display 110, the control panel 120, the image reading unit 150, and the like. The series of printing operations includes an operation of inputting image information, an operation of forming an image, an operation of transferring the formed image to a sheet, an operation of conveying the sheet, and the like.

The sheet storage unit 140 includes a plurality of sheet cassettes. Each sheet cassette stores sheets for each sheet category. The sheet category includes a sheet size and a sheet type. For example, the sheet size is an A5 size, an A4 size, and an A3 size. Further, the sheet type is a normal copying paper, a sheet provided with a wireless tag, or the like. The wireless tag is, for example, a Radio Frequency Identifier (RFID) tag. In addition, the sheet type includes a photographic sheet, a label sheet, a polyester film sheet, and the like.

In the present embodiment, the plurality of sheet cassettes includes a sheet feed cassette in which a normal copying sheet is stored, and a sheet feed cassette in which a sheet with a wireless tag is stored. In addition, the image forming apparatus stores information that associates each of the sheet feed cassettes with the sheet category of the sheet stored therein. This association can be set by an operation of an operator such as a user or an inspection staff. When the sheet category of the sheet to be printed is selected, the image forming apparatus 10 can identify the sheet cassette in which the designated sheet is accommodated.

The image reading unit 150 includes an automatic document feeder (ADF) and a scanner. The automatic document feeder feeds a document placed on a document tray to the scanner device. The scanning device optically scans a document on a scanner glass, and a Charge Coupled Device (CCD) forms an image of reflected light from the document on a light receiving surface of the sensor. As a result, the scanner device reads the document image on the scanner glass. The image reading unit 150 generates image information by using the reading result read by the scanner device. The scanner device is not limited to the device reading a document on the scanner glass sent from the automatic document feeder, and can also read a document placed on the scanner glass by a user.

(Internal Configuration of Image Forming Apparatus 10)

Next, the internal structure of the image forming apparatus 10 will be described with reference to FIG. 3.

Figure 3:
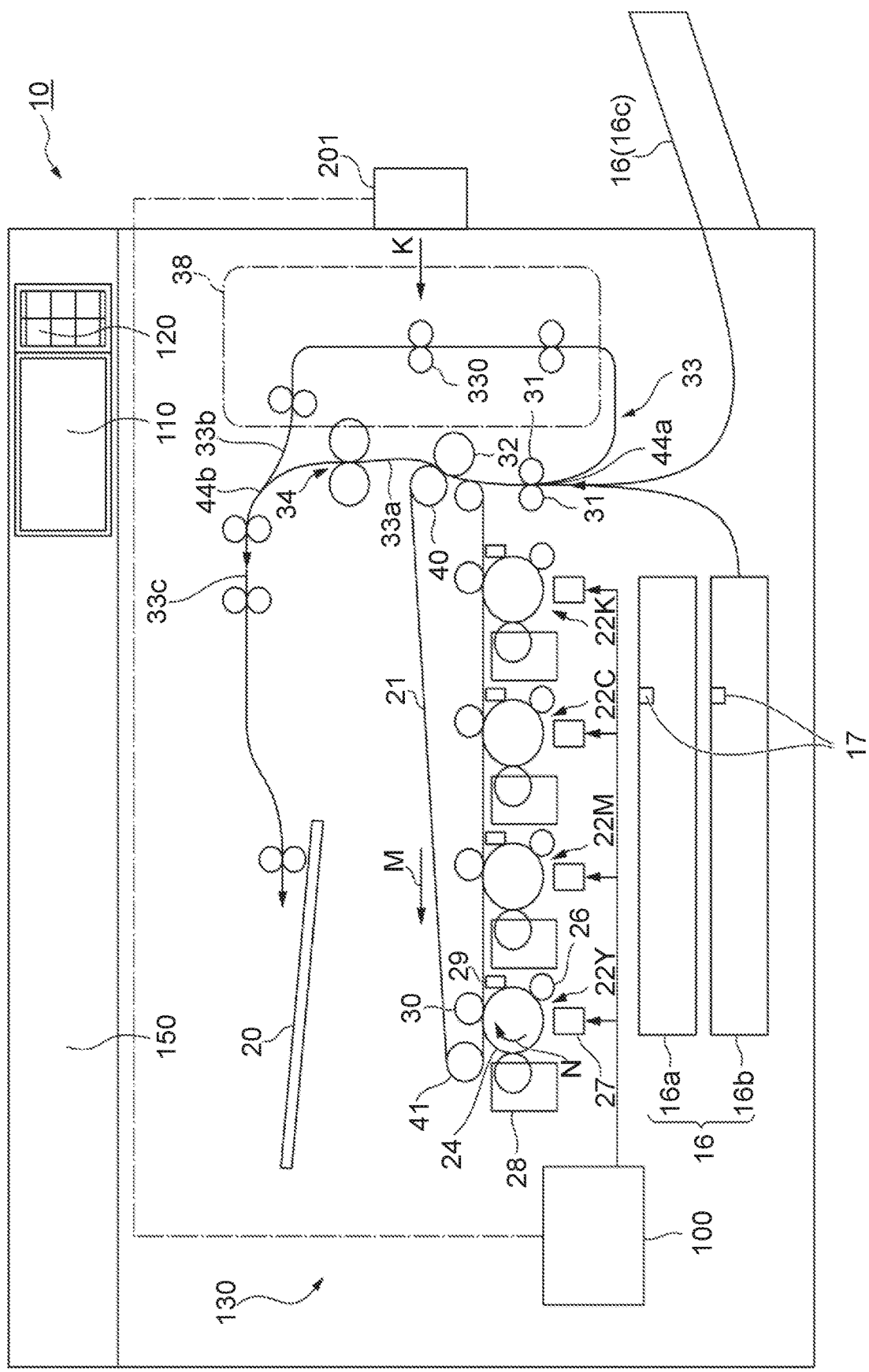
FIG. 3 depicts an internal structure of the image forming apparatus.

FIG. 3 is an explanatory diagram of the internal structure of the image forming apparatus 10 according to the first embodiment.

As shown in FIG. 3, the image forming apparatus 10 includes a printer 130. The printer 130 includes a main controller 100, sheet feed cassettes 16 (16a and 16b), a wireless tag communication device 201, and the like. The main controller 100 controls the control panel 13, the wireless tag communication device 201, and the printer 130. The main controller 100 controls conveyance of a sheet in the printer 130. The control of the conveyance of the sheet is to control the conveyance timing of the sheet, the stop position of the sheet, the conveyance speed of the sheet, and the like.

(Sheet Storage)

The sheet feed cassette 16 stores a sheet provided with a wireless tag. The sheet feed cassette 16 can also store a sheet without a wireless tag. As the sheet, for example, a material such as paper or a plastic film is used. In the following explanation, the sheet is a sheet provided with a wireless tag.

The sheet feed cassette 16 includes an opening and closing detection unit that detects opening and closing of the cassette, and a sheet detection unit 17 that detects the presence or absence of a sheet inside the cassette. The sheet detection unit 17 is, for example, an optical sensor. The optical sensor illuminates the printable surface of the sheet with light and receives the reflected light. When the printable surface of the sheet is a bright color such as white, the optical sensor detects the strongly reflected light because the light reflectance is large. On the other hand, when the sheet is not present in the sheet feed cassette 16, the optical sensor detects the weak reflected light. In this way, the presence or absence of a sheet in the sheet feed cassette 16 can be determined by the intensity of the reflected light.

(Image Formation)

The printer 130 performs the operation of forming an image on a sheet. For example, the printer 130 forms an image indicated by the image data on the sheet. In the following description, forming an image on a sheet is also referred to as "printing". In the present embodiment, the printer 130 is a toner type in which toner is attached to a sheet, but the present invention is not limited thereto, and may be an ink jet type in which ink is sprayed onto the sheet.

The printer 130 includes an intermediate transfer belt 21. The intermediate transfer belt 21 is supported by a driven roller 41, a backup roller 40, and the like. The intermediate transfer belt 21 rotates in the direction of arrow M shown in FIG. 3. The printer 130 also includes four sets of imaging stations 22Y, 22M, 22C, and 22K. The respective imaging stations 22Y, 22M, 22C, and 22K correspond to Y (yellow), M (magenta), C (cyan) and K (black), respectively. The imaging station 22Y, 22M, 22C, and 22K are disposed below the intermediate transfer belt 21 along the rotational direction of the intermediate transfer belt 21.

In the following, the image forming station 22Y among the image forming station 22Y, 22M, 22C, and 22K will be exemplified. The image forming station 22M, 22C, and 22K of the other colors have the same configuration as the image forming station 22Y.

The imaging station 22Y includes a photoconductor drum 24, a charger 26, an exposure scanning head 27, a developing device 28, a photoconductor cleaner 29, and a primary transfer roller 30. The photoconductor drum 24 rotates in the direction of arrow N. The charger 26, the exposure scanning head 27, the developing device 28, and the photoconductor cleaner 29 are disposed around the photoconductor drum 24.

The primary transfer roller 30 is disposed to face the photosensitive drum 24 via the intermediate transfer belt 21.

The charger 26 uniformly charges the photosensitive drum 24. The exposure scanning head 27 exposes the uniformly charged photoconductor drum 24 to form an electrostatic latent image on the photoconductor drum 24. The developing device 28 develops an electrostatic latent image on the photosensitive drum 24 using, for example, a two-component developer formed by toner and a carrier.

The primary transfer roller 30 performs primary transfer of the toner image formed on the photosensitive drum 24 to the intermediate transfer belt 21. The primary transfer roller 30 of each of the image forming stations 22Y 22M, 22C, and 22K performs the primary transfer of the toner image on the intermediate transfer belt 21, thereby forming a color toner image on the intermediate transfer belt 21. The color toner image is a toner image formed by sequentially superimposing Y (yellow), M (magenta), C (cyan), and K (black) toner images. The photoconductor cleaner 29 removes toner remaining on the photoconductor drum 24 after the primary transfer.

The printer 130 includes a secondary transfer roller 32. The secondary transfer roller 32 is disposed to face the backup roller 40 via the intermediate transfer belt 21. The secondary transfer roller 32 collectively performs secondary transfer of the color toner images on the intermediate transfer belt 21 onto the sheet. In the following description, a "toner image" may be either a color toner image using a plurality of colors or a toner image using only one color. The toner image may be a toner image using a decolored toner.

(Sheet Conveyance)

A conveyance path 33 is a path along which a sheet is conveyed by a conveyer including a plurality of conveyance rollers (for example, the conveyance roller 330). The conveyance path 33 includes a first conveyance path 33a, a second conveyance path 33b, and a third conveyance path 33c. The first conveyance path 33a is a conveyance path from a merging portion 44a to a branch portion 44b. The second conveyance path 33b is a conveyance path passing through a double-sided printer 38, and is a conveyance path from the branch portion 44b to the merging portion 44a. The third conveyance path 33c is a conveyance path from the branch portion 44b to a sheet discharge tray 20.

The sheet is taken out from any one of the sheet feed cassette 16a, the sheet feed cassette 16b, and the manual feed tray 16c. The sheet taken out from the sheet storage unit is temporarily stopped at a portion where the two registration rollers 31 are in contact with each other. At this time, the leading edge of the sheet abuts against the registration roller 31, and the inclination of the sheet is corrected. The main controller 100 starts the rotation of the registration roller 31 in accordance with the position of the toner image of the rotating intermediate transfer belt 21, and moves the sheet to the position of the secondary transfer roller 32.

The toner image formed on the intermediate transfer belt 21 is secondarily transferred to the sheet by the secondary transfer roller 32. Further, the toner image that has been secondarily transferred is fixed to the sheet by a fixing device 34. In this manner, an image is formed on the sheet under the control of the main controller 100. The main controller 100 conveys the sheet on which the toner image has been fixed by the fixing device 34 in the third conveyance path 33c, and discharges the sheet.

(Wireless Tag Communication Device 201)

The wireless tag communication device 201 includes a controller, a storage device, and an antenna (not shown). The wireless tag in this embodiment is, for example, a Radio Frequency Identifier (RFID). For example, the wireless tag communication device 201 transmits a radio wave in the direction of arrow K. The wireless tag communication device 201 communicates with a wireless tag provided on the sheet via the antenna. Specifically, the wireless tag communication device 201 reads information from the wireless tag and writes information to the wireless tag.

For example, in the case of a sheet used for logistics or the like, the information to be written in wireless tag indicates a destination, text printed on the sheet, and the like. In the present embodiment, for example, a 900 MHz band radio wave system (UHF) is used by the wireless tag communication device 201. However, the RFID method and the frequency band are not limited thereto, and other methods and frequency bands may be adopted.

(Hardware Configuration of Cloud Server 1)

Figure 4:
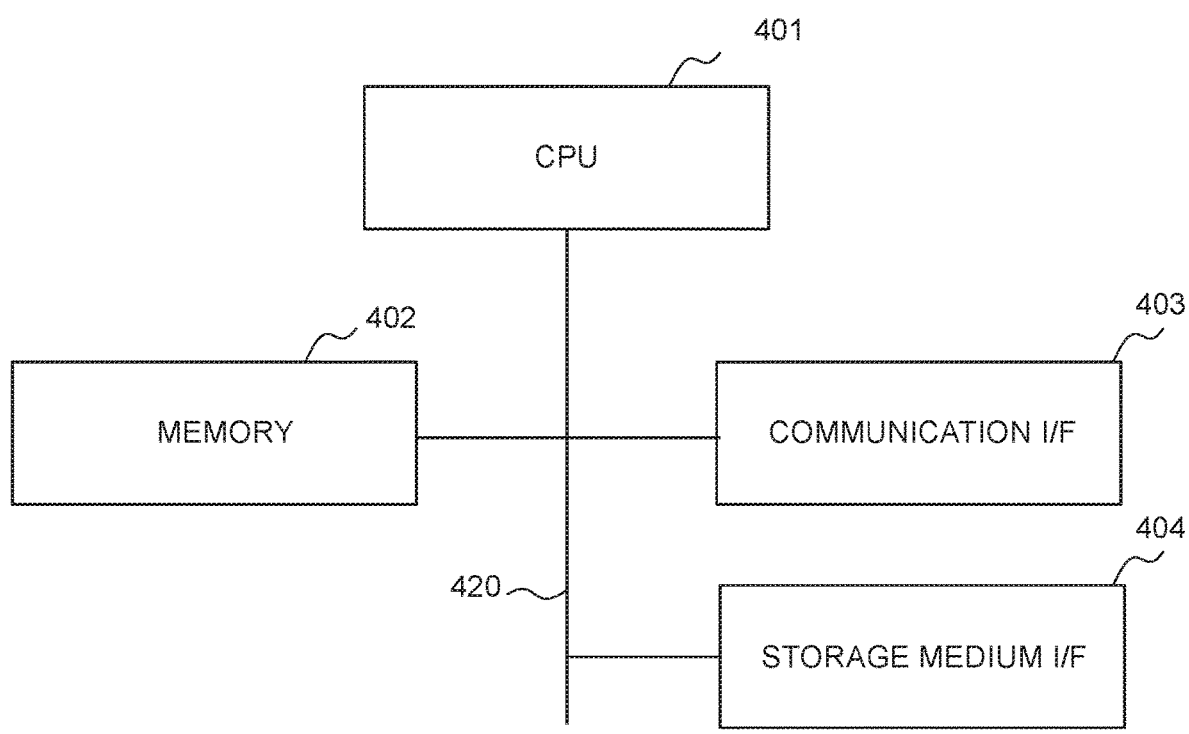
FIG. 4 is a hardware block diagram of a cloud server in the parameter setting system.

FIG. 4 is a hardware block diagram of the cloud server 1. As illustrated in FIG. 4, the cloud server 1 includes a CPU 401, memory 402, communication interface (I/F) 403, and a storage medium I/F 404. Each unit is connected by a bus 420.

The CPU 401 is a main controller and controls the entire cloud server 1. The memory 402 included, for example, a ROM, a RAM and a flash ROM. For example, the flush ROM and the ROM store various programs. The various programs include a parameter transmission program according to the present embodiment. The RAM is used as a work area of the CPU 401. The program is loaded into the memory 402 and executed by the CPU 401.

The communication I/F 403 is connected to the network 5 such as the Internet via a communication line, and is connected to image forming apparatus 10 via the network 5. In addition, the communication I/F 403 controls the input and output of data from and to other devices via the network 5.

The storage medium I/F 404 controls reading and writing of data from and to a storage medium (not shown), such as a Universal Serial Bus (USB) flash memory, a Solid State Drive (SSD), a magnetic disk, and an optical disk, under the control of the CPU 401.

(Hardware Configuration of Image Forming Apparatus 10)

Next, the hardware configuration of the image forming apparatus 10 will be described with reference to FIG. 5.

Figure 5:
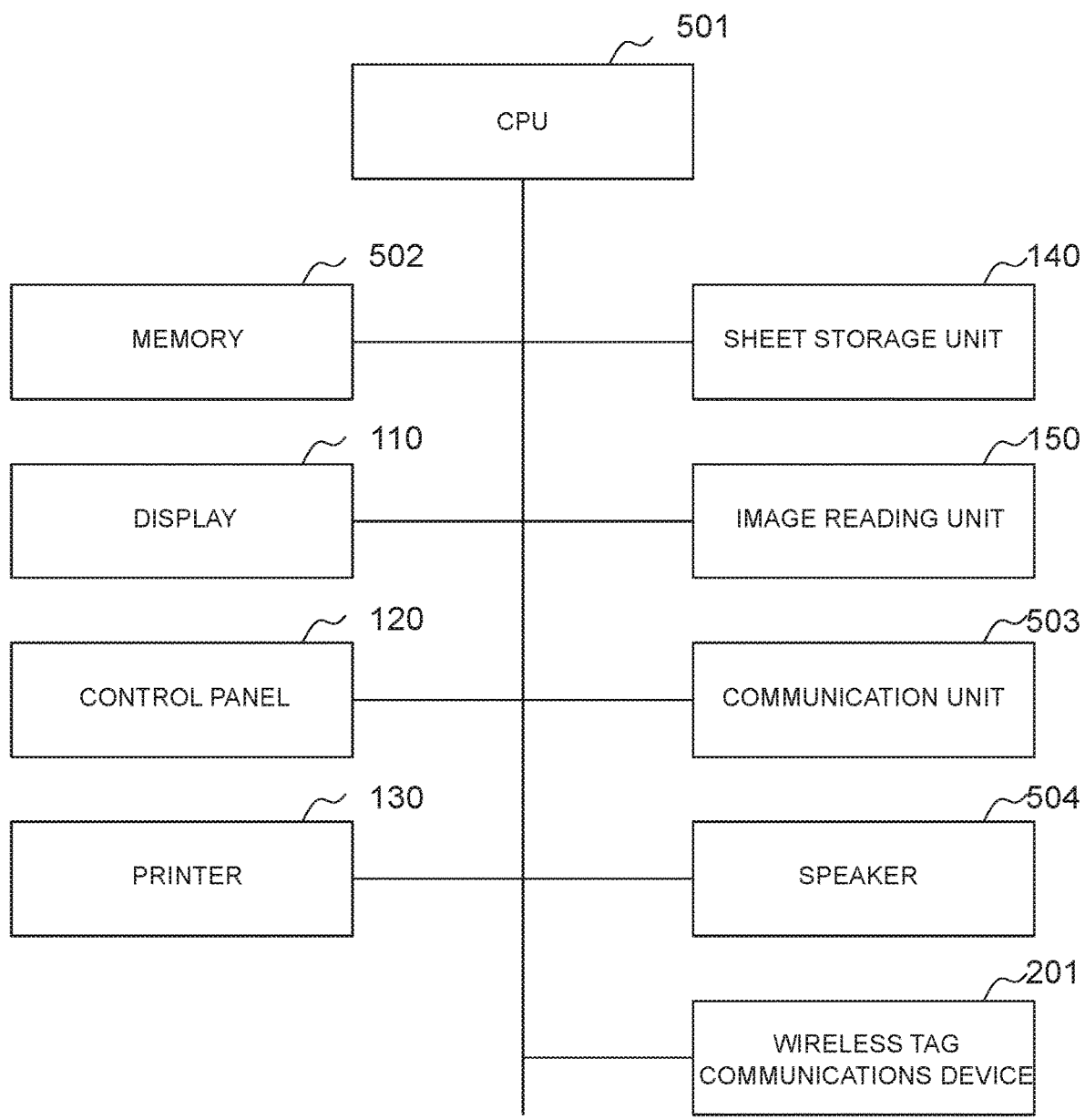
FIG. 5 is a hardware block diagram of the image forming apparatus.

FIG. 5 is a hardware block diagram of the image forming apparatus 10. In FIG. 5, the image forming apparatus 10 includes a Central Processing Unit (CPU) 501, a memory 502, a communication unit 503, and a speaker 504 in addition to the above-described configuration. These can communicate with each other via a bus.

The CPU 501 is responsible for controlling the entire image forming apparatus 10. The memory 502 includes, for example, a ROM, a RAM and a flash ROM. For example, the flush ROM and the ROM store various programs. The various programs include a parameter setting program according to the present embodiment. The RAM is used as a work area of the CPU 501. The program is loaded into the memory 502 and executed by the CPU 501.

The communication OF 503 is connected to a network 5 such as the Internet via a communication line, and is connected to the cloud server 1 via the network 5. In addition, the communication I/F 503 controls the input and output of data from and to other devices via the network 5.

The speaker 504 outputs sound.

(Exemplary Arrangement of a Wireless Tag on a Sheet)

Next, an exemplary arrangement of a wireless tag on a sheet will be described with reference to FIGS. 6 to 8.

Figure 6:
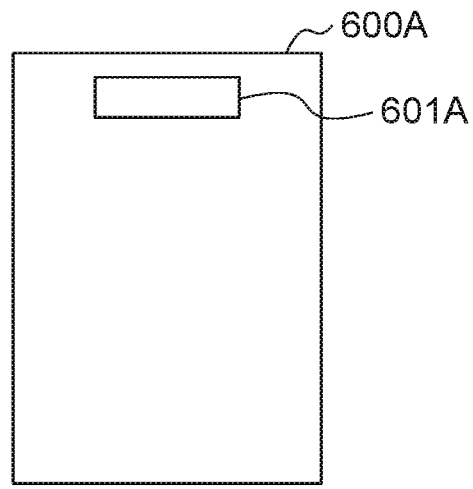
FIGS. 6-8 depict a sheet including a wireless tag.
Figure 7:
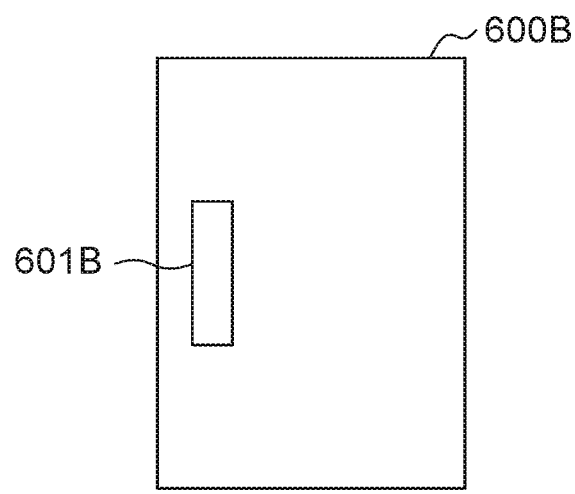
Figure 8:
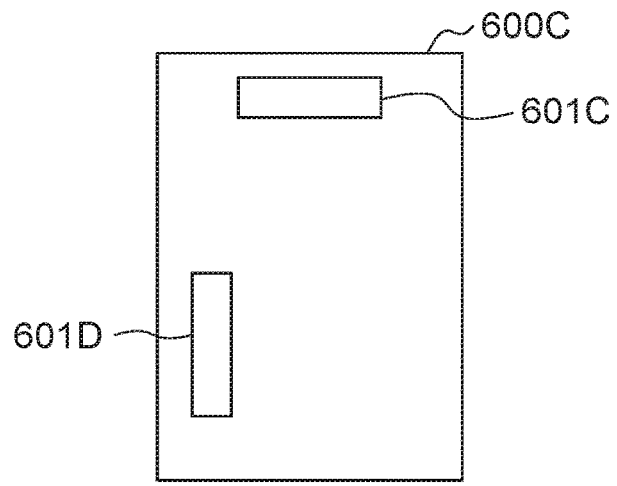

FIGS. 6 to 8 are diagrams showing the arrangement of a wireless tag on a sheet. In FIGS. 6 to 8, the size of the sheet 600 (600A-600C) is, for example, A4. The arrangement position of each wireless tag 601 (601A-601D) differs depending on the sheet category.

For example, in the sheet 600A of FIG. 6, the wireless tag 601A is disposed at the center of the longitudinal side portion. In the sheet 600B of FIG. 7, the wireless tag 601B is disposed at the center of the lateral portion. In the sheet 600C of FIG. 8, the wireless tags 601C and 601D are disposed at the center of the side portion in the longitudinal direction and below the side portion in the widthwise direction, respectively.

In the drawings, three arrangement examples are shown for the wireless tags 601, but the arrangement example is not limited to such an arrangement example. For example, the position of the wireless tags 601 may vary depending on the category of the sheet 600. Also, the size and thickness of the sheet 600 differ depending on the category of the sheet 600.

(Packaging of Sheets)

Next, the packaging of the sheet 600 will be described with reference to FIGS. 9 to 11.

Figure 9:
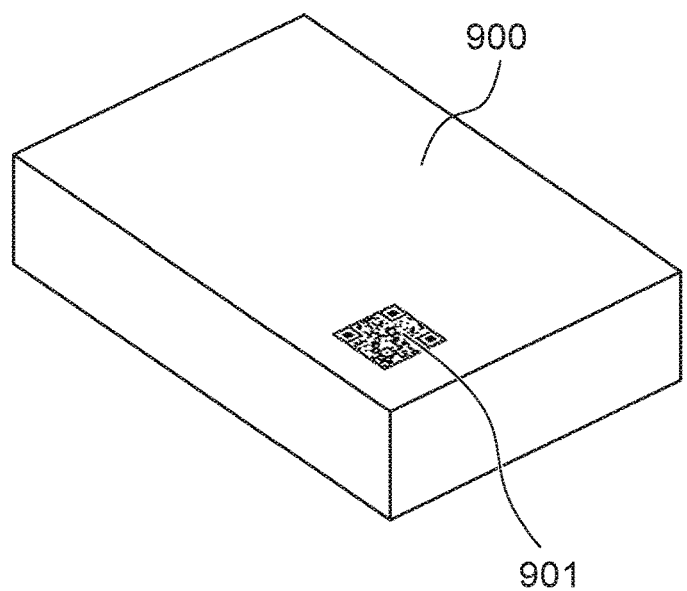
FIG. 9 depicts a package for sheets.

FIG. 9 depicts a package of the sheet 600. As shown in FIG. 9, the sheet 600 is packaged in a paper sheet packaging material 900. The sheet packaging material 900 is printed with a sheet identification code 901 identifying the category of the sheet 600 (hereinafter also referred to as the sheet identification information). The sheet identification code 901 is represented by a two-dimensional code, such as a QR code. However, the sheet identification code 901 may be represented by a one-dimensional code (i.e., a bar code).

For example, when the sheet 600 taken out from the sheet packaging material 900 is filled in the sheet feed cassette, the user places the sheet packaging material 900 on the scanner glass and causes the scanner device (i.e., the image reading unit 150) to read the sheet identification code 901. Thus, the image forming apparatus 10 can acquire the sheet identification information. Note that, in sheet packaging material 900, a cut or perforated line by which an area including a part of the sheet identification code 901 can be detached may be formed. In this way, the user can also cut the area containing the part of the sheet identification code 901 and cause the scanner device to read the sheet identification code 901.

Figure 10:
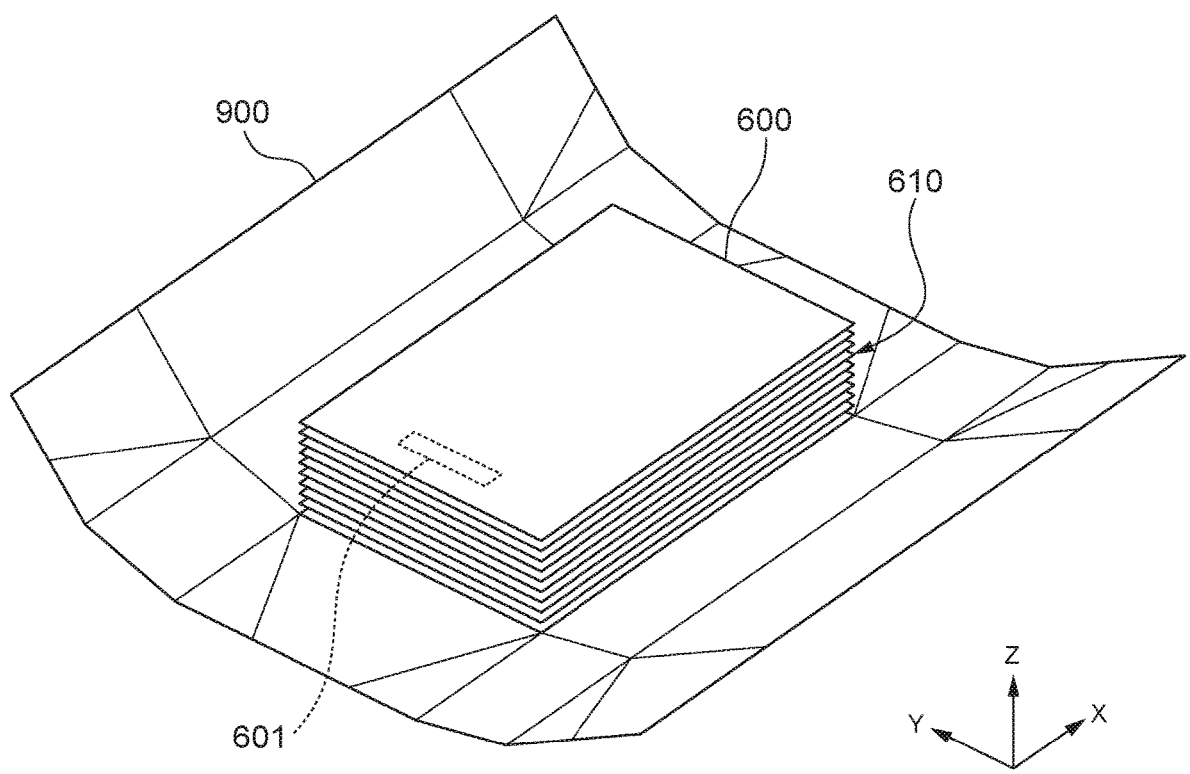
FIG. 10 is an exploded view of the package when a sheet packaging material is opened.

FIG. 10 is an exploded view when sheet packaging material 900 is opened. As shown in FIG. 10, the sheet packaging material 900 packs a sheet bundle 610. In the drawing, the Z direction, the X direction and the Y direction of the orthogonal coordinate system are defined as follows. The Z direction is a stacking direction of the sheets 600 in the sheet bundle 610. For example, the Z direction is a vertical direction, and −Z direction is a downward direction. The X direction is a longitudinal direction of the sheet 600. The Y direction is a lateral direction of the sheet 600. For example, the X direction and the Y direction are horizontal directions.

Figure 11:
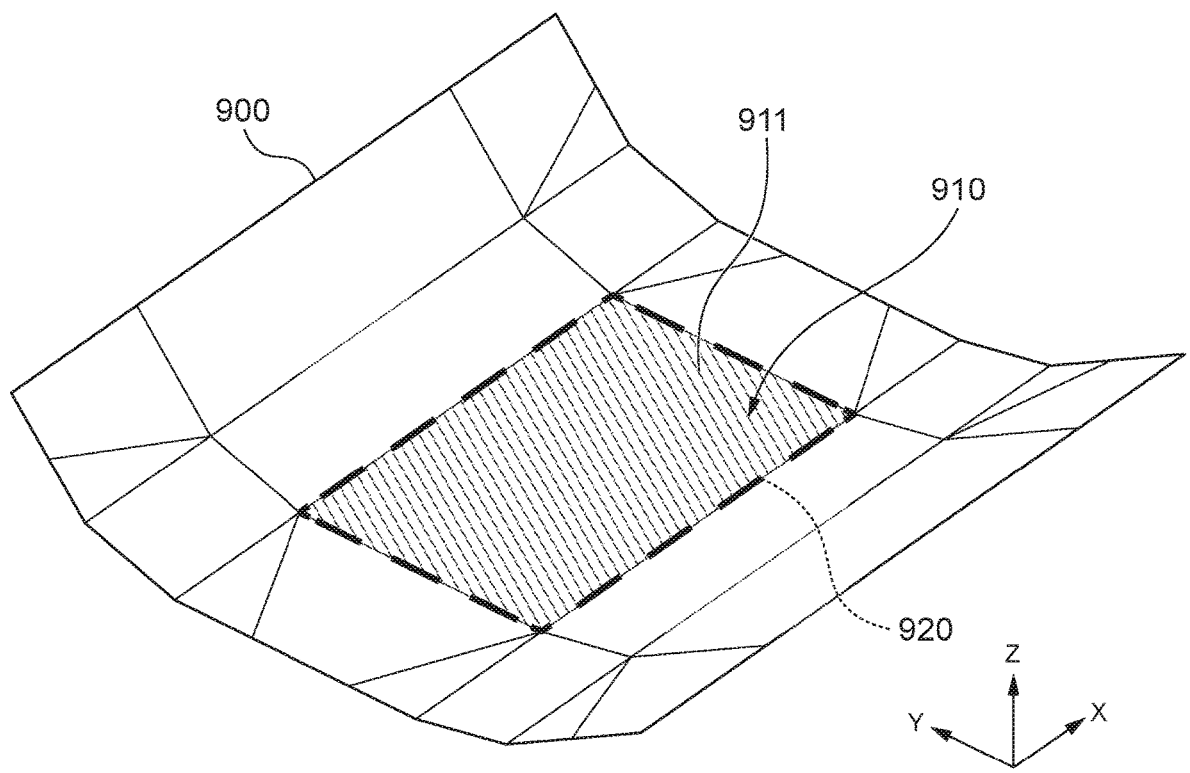
FIG. 11 is a developed view of the sheet packaging material after the sheets are taken out.

FIG. 11 is a developed view of the sheet packaging material 900 after the sheet 600 is taken out. As shown in FIG. 11, a conductive sheet 910 is formed on sheet packaging material 900 in a lower surface (−Z) area contacting the sheet bundle 610. The base material of the conductive sheet 910 is formed of paper, a resin material, or the like.

In the sheet packaging material 900, perforated lines 920 are formed around the conductive sheet 910. The conductive sheet 910 is easily separated from sheet packaging material 900 along the lines 920. With the sheet bundle 610 and the conductive sheet 910 overlapped, the user takes out the conductive sheet 910 from the sheet packaging material 900 and stores it in the sheet feed cassette 16.

In the conductive sheet 910, a conductive region is formed on the entire front surface in −Z direction (i.e., the rear side in the drawing), and a light reflectance adjustment region 911 is formed on the entire front surface in the +Z direction. The conductive region is a region for suppressing erroneous reading and writing with respect to the sheet 600 other than the printing target. The light reflectance adjustment region 911 detects the presence or absence of the sheet 600 in the sheet feed cassette 16. Hereinafter, the conductive region and the light reflectance adjustment region 911 will be described in detail.

(Conductive Region)

The conductive region is formed of a conductive material, for example, a metal material such as aluminum. When the plurality of sheets 600 are present in the sheet feed cassette 16, the wireless tags 601 of the sheets 600 overlap in the Z direction. At this time, the impedance of the antenna of each wireless tag 601 is reduced, and the matching with the chip is lost, making it difficult to communicate between the wireless tag communication device 201 and wireless tag 601. As a result, erroneous reading and writing of the plurality of sheets 600 in the sheet feed cassette 16 is suppressed.

On the other hand, when the sheet 600 in the sheet feed cassette 16 is consumed and the remaining sheet 600 becomes one, the wireless tag 601 does not overlap in the Z direction. The conductive region suppresses erroneous reading and writing of the sheet 600. Specifically, the remaining sheet 600 and the conductive regions of the conductive sheet 910 overlap in the wireless tag 601 and the Z direction. This reduces the impedance of the antenna of the wireless tag 601, making it difficult to communicate between the wireless tag 601 and the wireless tag communication device 201. Accordingly, erroneous reading and writing of the remaining one sheet 600 in the sheet feed cassette 16 is suppressed.

(Light Reflectance Adjustment Region 911)

The light reflectance adjustment region 911 may have a brightness different from that of the printable surface of the sheet 600. For example, when the printable surface of the sheet 600 is a bright color such as white, the color of the light reflectance adjustment region 911 is a dark color such as black. When the light reflectance adjustment region 911 is dark in color, the light reflectance is smaller than the printable surface. On the other hand, when the printable surface of the sheet 600 is a dark color, the color of the light reflectance adjustment region 911 is a light color. When the light reflectance adjustment area 911 is bright, the light reflectance of the light reflectance adjustment region 911 is greater than the printable surface.

The light reflectance adjustment region 911 overlaps the detection position of the sheet 600 by the sheet detection unit 17 when viewed in the Z direction. When the sheet 600 is not present in the sheet feed cassette 16, the sheet detection unit 17 detects the reflected light of the light reflectance adjusting region 911 of the conductive sheet 910. Since the reflectance or light intensity of the light reflectance adjustment region 911 is different from the light reflectance of the sheet 600, the absence of the sheet 600 is determined.

Note that the conductive sheet 910 is not limited to a part of the sheet packaging material 900. A separated conductive sheet may be packed in the sheet bundle 610 in the same manner as the sheet 600. The conductive sheet may be disposed on a surface of the sheet bundle 610 that contacts sheet packaging material 900 at the lowermost position and packaged.

(Parameter Data Stored in Parameter DB 6)

Next, exemplary parameters stored in the parameter DB 6 will be described with reference to FIG. 12.

Figure 12:
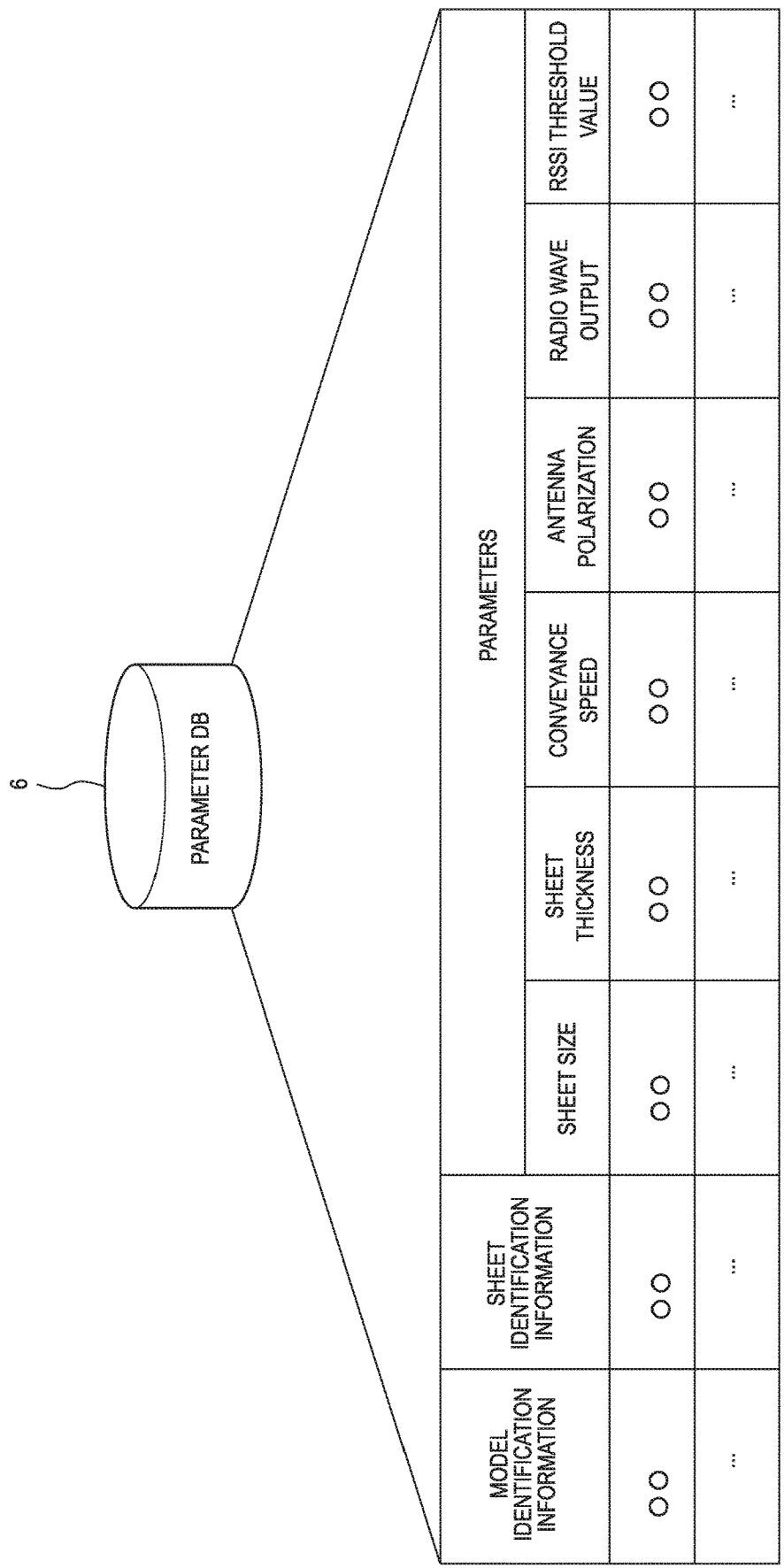
FIG. 12 depicts a data structure of a parameter database (DB).

FIG. 12 is a diagram of parameter data stored in the parameter DB 6. As illustrated in FIG. 6, the parameter DB 6 includes items of "model identification information", "sheet identification information", and "parameters".

The "model identification information" identifies a category of the image forming apparatus 10. The "sheet identification information" identifies a category of the sheet 600 including the wireless tag 601. The "parameters" are setting information corresponding to the "model identification information" and the "sheet identification information". Specifically, the "parameters" includes items of "sheet size", "sheet thickness", "conveyance speed", "antenna polarization", "radio wave output", and "Received Signal Strength Indicator (RSSI) threshold value".

The "sheet size" indicates the size of the sheet 600, such as A3 and A4. The "sheet thickness" indicates the thickness of the sheet 600. The "conveyance speed" indicates the conveyance speed of the sheet 600 through the conveyance path 33. The "antenna polarization" indicates the direction of the radio wave with respect to the wireless tag 601 provided in the sheet 600 moving through the conveyance path 33. The "radio wave output" indicates the power of a radio wave output towards the wireless tag 601 of the target sheet 600. The "RSSI threshold value" indicates a threshold value of the radio wave strength. Specifically, the "RSSI threshold value" indicates a radio wave strength from the wireless tag 601 of the target sheet 600 at which data can be written and that can prevent data from being written to the wireless tag 601 of another sheet 600 in the image forming apparatus 10.

The "parameters" are not limited to the above items. For example, the "parameters" may include information that allows the sheet 600 to be conveyed in the image forming apparatus 10 and the sheet 600 not to be moved to be distinguished from each other, and may specifically include a phase change pattern or an RSSI change pattern.

(Functional Configuration of Image Forming Apparatus 10 According to the First Embodiment)

Next, the functional configuration of the image forming apparatus 10 according to the first embodiment will be described with reference to FIG. 13.

Figure 13:
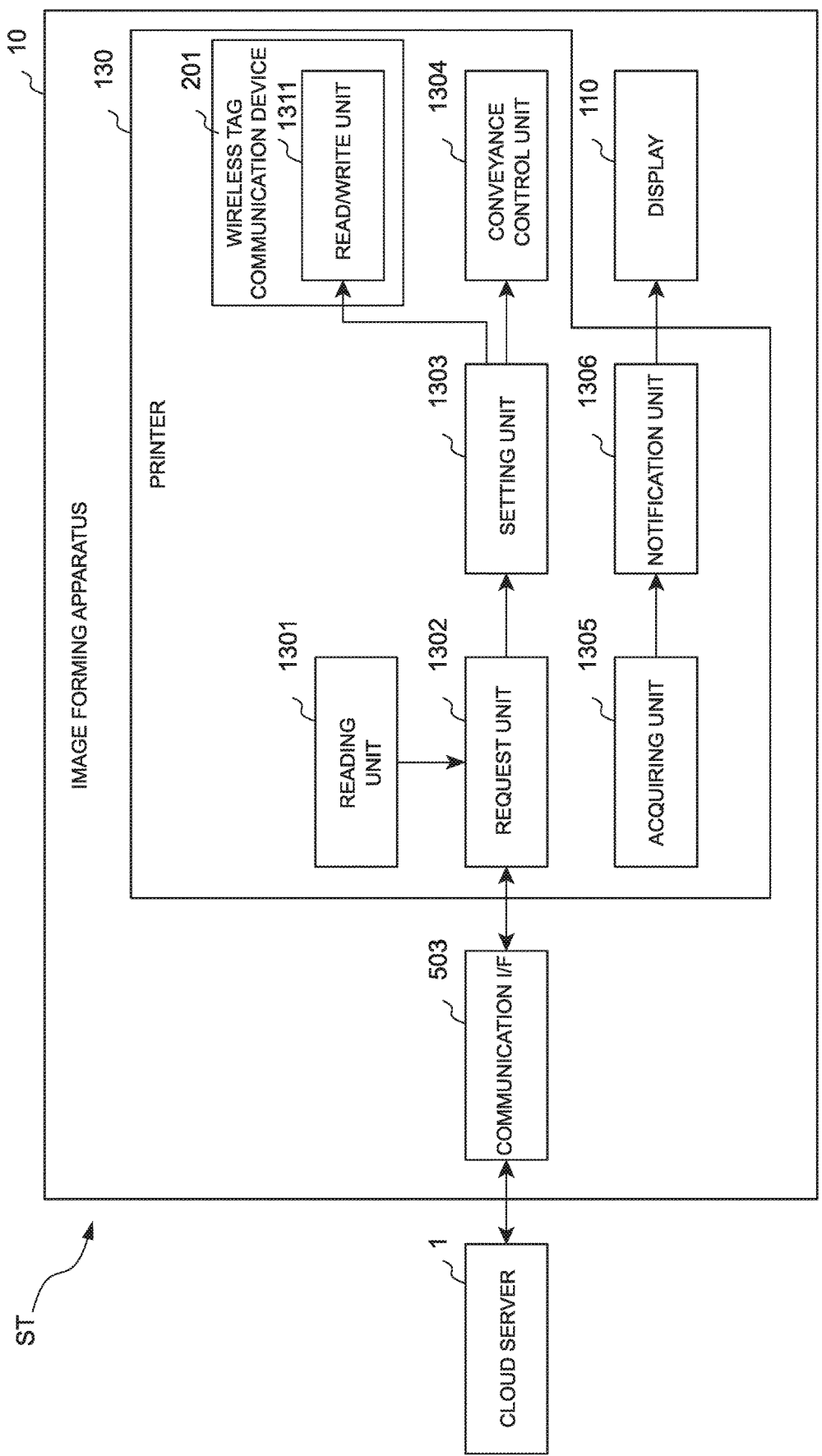
FIG. 13 is a functional block diagram of the image forming apparatus according to a first embodiment.

FIG. 13 is a functional block diagram of the image forming apparatus 10 including the printer 130 according to the first embodiment. In FIG. 13, the wireless tag communication device 201 included in the printer 130 includes the read/write unit 1311. The function of the read/write unit 1311 is performed by a controller or a processor included in the wireless tag communication device 201. That is, the controller included in the wireless tag communication device 201 execute programs to perform the function of the read/write unit 1311.

In FIG. 13, the printer 130 includes a reading unit 1301, a request unit 1302, a setting unit 1303, a conveyance control unit 1304, an acquiring unit 1305, and a notification unit 1306. The function of each unit is performed by the CPU 501. That is, the CPU 501 executes the parameter setting program stored in the memory 502 to perform the function of each unit.

Note that the functional units of the printer 130 may not be performed by a processor such as a CPU. For example, some or all of these functional units may be performed by hardware (e.g., circuitry) such as Large Scale Integration (LSI), Application Specific Integrated Circuit (ASIC), Field-Programmable Gate Array (FPGA), Graphics Processing Unit (GPU), or the like, or may be realized by cooperation of software and hardware. The program may be stored in advance in a storage device such as a Hard Disk Drive (HDD) or a flash memory, or may be stored in a removable storage medium or a non-transitory computer readable storage medium such as a DVD or a CD-ROM and installed therefrom.

The read/write unit 1311 reads and writes data stored in the wireless tag 601 included in the sheet 600.

(Reading Sheet Identification Code 901)

The function of the reading unit 1301 is achieved using the scanner device included in the image reading unit 150. The reading unit 1301 control the scanner device to read a sheet identification code 901 (i.e., sheet identification information) identifying a category of the sheet 600. The reading unit 1301 controls the scanner device to read the sheet identification code 901 printed on the sheet packaging material 900 placed on the scanner glass in response to the user's operation. The reading unit 1301 may acquire the sheet identification 901 through a scanner device separately provided in the printer 130 and capable of reading the sheet identification code 901.

(Parameter Transmission Request)

The request unit 1302 requests the cloud server 1 to transmit the setting information based on the sheet identification code 901. The setting information is the parameters stored in the parameter DB 6. The transmission request includes the model identification information for identifying the own device and the sheet identification information obtained by reading the sheet identification code 901 by the reading unit 1301.

(Parameter Setting)

The setting unit 1303 sets the parameters received from the cloud server 1 to the read/write unit 1311 in response to the sending request. As a result, "antenna polarization", "radio wave output", and "RSSI threshold value" are set in the read/write unit 1311 as parameters corresponding to the sheet 600 to be used.

The conveyance control unit 1304 performs control related to conveyance of the sheet 600. The control related to the conveyance is, for example, control of the conveyance rate of the sheet 600 on the conveyance path 33. The setting unit 1303 sets the setting information received from the cloud server 1 to the conveyance control unit 1304 in response to the sending request. As a result, "sheet size", "sheet thickness", and "conveyance speed" are set in the conveyance control unit 1304 as parameters corresponding to the sheet 600 to be used. In the conveyance control unit 1304, at least "conveyance speed" may be set.

(Notice that Prompts to Read Sheet Identification Code 901)

The acquiring unit 1305 obtains information related to replenishment of the sheet 600 to the sheet storage unit 140. The sheet storage unit 140 includes the sheet feed cassettes 16 (16a and 16b) and the manual feed tray 16c. The information regarding the replenishment is, for example, information indicating that one of the sheet feed cassettes 16a and 16b or the manual feed tray 16c has been opened. However, the information regarding the replenishment is not limited thereto, and may be information indicating that the absence of the sheet 600 in the sheet feed cassette 16 is detected by the sheet detection unit 17. Further, in the manual feed tray 16c, the information regarding the replenishment may be information indicating that the absence of the sheet 600 on the manual feed tray 16c is detected by the detecting unit that detects the sheet 600 on the manual feed tray 16*c*, or may be information indicating that the replenishment of the sheet 600 on the manual feed tray 16*c* is detected.

The notification unit 1306 controls the display 110 to notify the user that the sheet identification code 901 is to be read in response to the replenishment being acquired by the acquiring unit 1305. The notification may be audio from the speaker 504 instead of or in addition to the notification on the display 110.

(Process of Setting of Parameters Performed by Image Forming Apparatus According to First Embodiment)

Next, a process of setting parameters performed by the image forming apparatus 10 including the printer 130 according to the first embodiment will be described with reference to FIG. 14.

Figure 14:
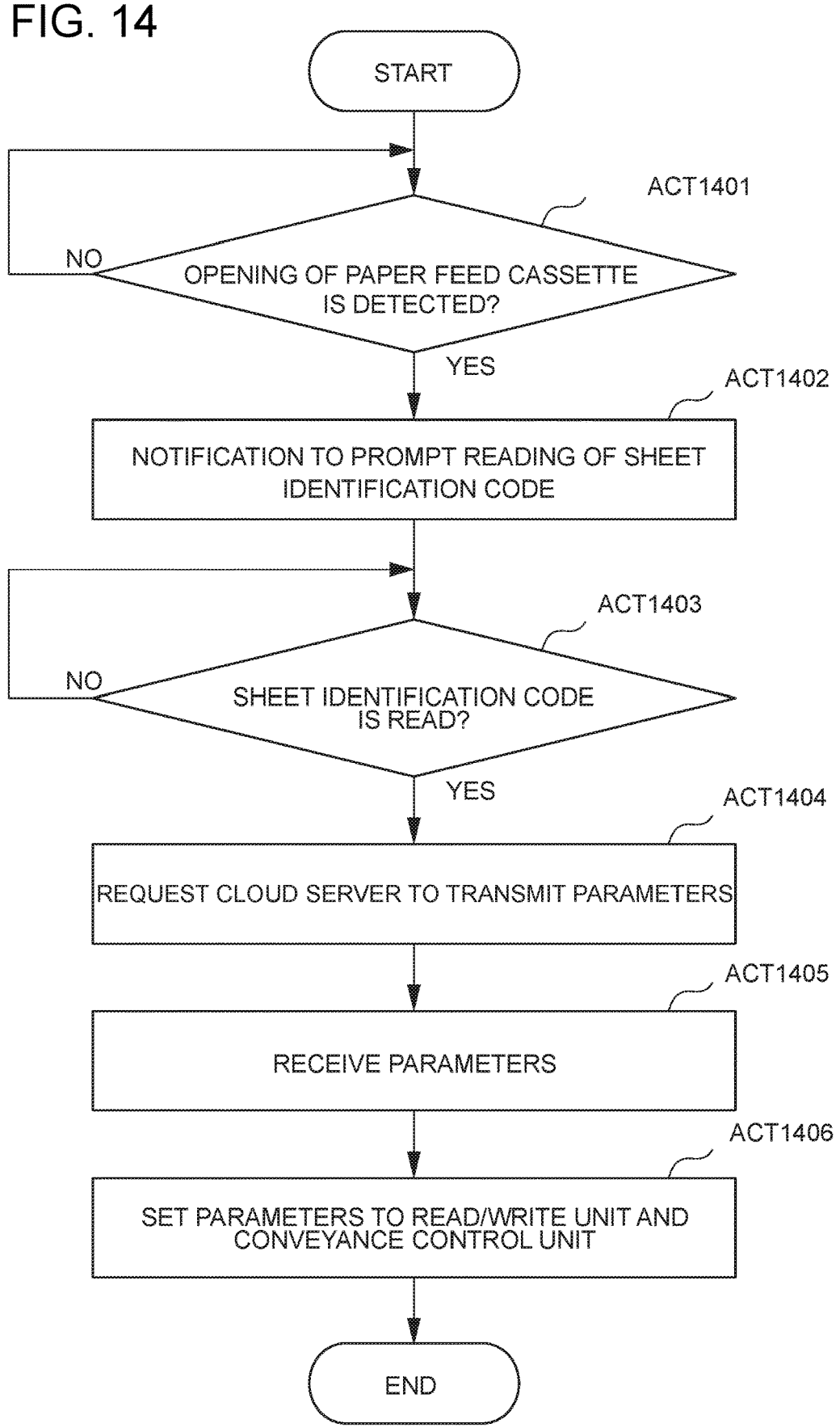
FIG. 14 is a flowchart of a process for setting parameters performed by the image forming apparatus according to a first embodiment.

FIG. 14 is a flowchart of a process for setting parameters performed by the image forming apparatus 10 according to the first embodiment.

In FIG. 14, the image forming apparatus 10 determines whether the opening of the sheet feed cassette 16 has been detected (ACT1401). The image forming apparatus 10 waits until the opening of the sheet feed cassette 16 is detected (ACT1401:NO), and when the opening of the sheet feed cassette 16 is detected (ACT1401:YES), a notification prompting the user to operate the image reading unit 150 or the scanner device to read the sheet identification code 901 is displayed on the display 110 (ACT1402).

Next, the image forming apparatus 10 determines whether the sheet identification code 901 has been read by the image reading unit 150 (ACT1403). The image forming apparatus 10 waits until the sheet identification code 901 is read (ACT1403:NO), and when the sheet identification code 901 is read (ACT1403:YES), requests the cloud server 1 to transmit parameters (ACT1404).

Then, the image forming apparatus 10 receives the parameters from the cloud server 1 (ACT1405). Next, the image forming apparatus 10 sets the received parameters to the read/write unit 1311 and the conveyance control unit 1304 (ACT1406), and ends the series of processes.

(Process of Transmission of Parameters by Cloud Server 1)

Next, with reference to FIG. 15, a process in which the cloud server 1 transmits parameters will be described.

Figure 15:
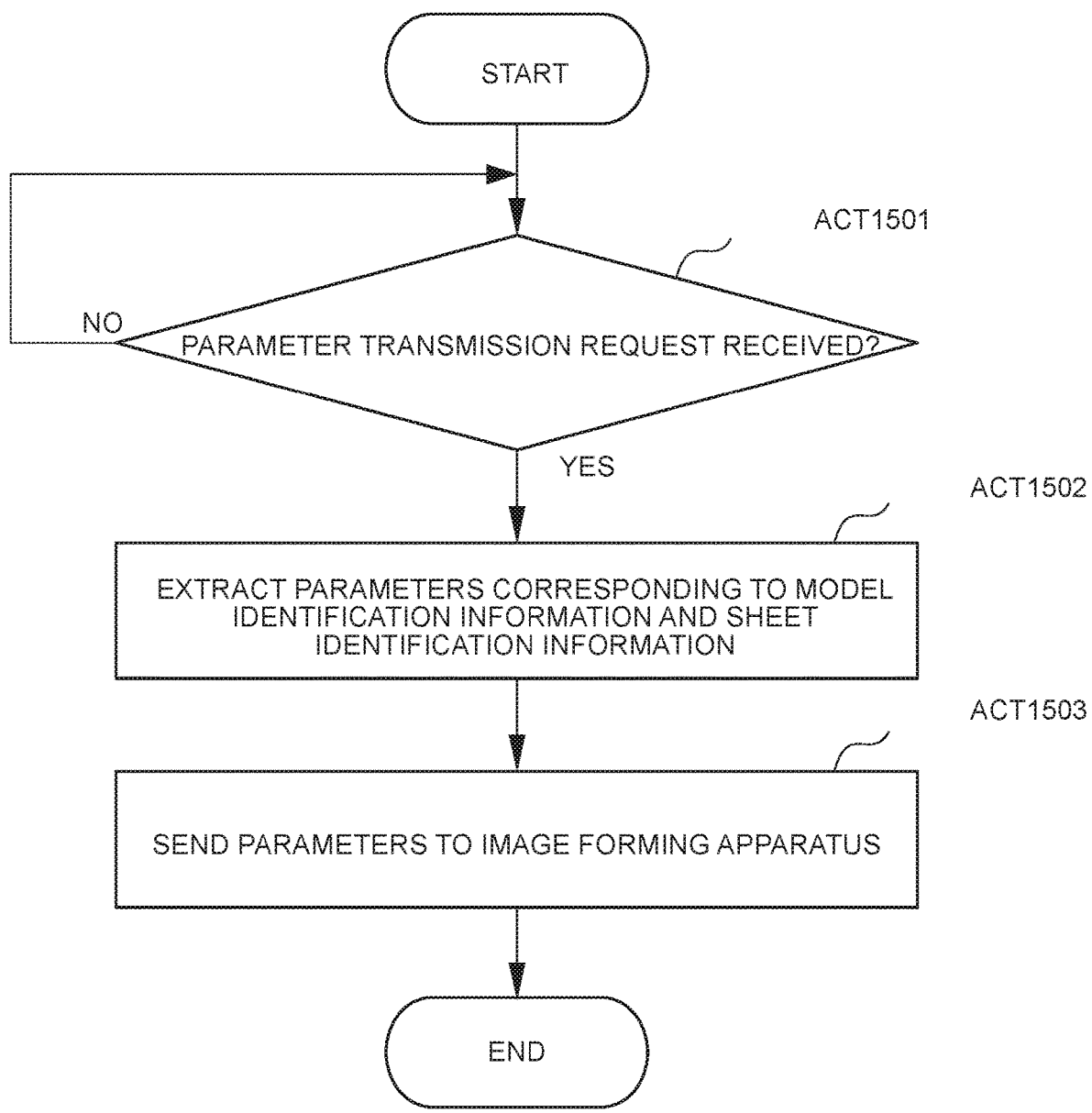
FIG. 15 is a flowchart of a process for the cloud server to transmit a parameter.

FIG. 15 is a flowchart of a process in which the cloud server 1 transmits parameters.

In FIG. 15, the cloud server 1 determines whether parameters are requested to be transmitted from the image forming apparatus 10 (ACT1501). The transmission request includes model identification information and sheet identification information. The cloud server 1 waits until the parameter transmission request is received (ACT1501:NO), and when the parameter transmission request is received (ACT1501:YES), extracts parameters corresponding to the model identification information and the sheet identification information from the parameters stored in the parameter DB 6 (ACT1502).

Then, the cloud server 1 transmits the extracted parameters to the image forming apparatus 10 of the transmission source of the transmission request (ACT1503), and ends the series of processes.

In the embodiment described above, the image forming apparatus 10 including the printer 130 sets setting information (i.e., parameters) based on the sheet identification code 901 read by the image reading unit 150 to the read/write unit 1311. Thus, the user can easily perform various settings of the read/write unit 1311 simply by causing the sheet identification code 901 to be read. Therefore, it is possible to reduce the time and effort of the user related to various settings of the read/write unit 1311, and it is possible to use the sheet feed cassette 16 for printing from the first sheet after the sheet 600 is replenished. Therefore, various settings of the read/write unit 1311 corresponding to type of the sheet 600 can be efficiently performed.

Further, the image forming apparatus 10 according to the embodiment described above sets setting information based on the sheet identification code 901 read by the image reading unit 150 to the conveyance control unit 1304. Thus, the user can easily perform various settings of the conveyance control unit 1304 simply by causing the sheet identification code 901 to be read. Therefore, it is possible to reduce the time and effort of the user related to various settings of the conveyance control unit 1304, and it is possible to use the sheet 600 for printing from the first sheet after the sheet 600 is replenished to the sheet feed cassette 16. Therefore, various settings of the conveyance control unit 1304 corresponding to the type of the sheet 600 can be efficiently performed.

Further, the image forming apparatus 10 according to the embodiment described above requests the cloud server 1 to transmit setting information based on the sheet identification code 901, and sets the received setting information in response to the transmission request. Thus, even if the image forming apparatus 10 does not store setting information for each category of the sheet 600, it is possible to acquire setting information from the cloud server 1. Further, even if the sheet identification code 901 of the latest sheet 600 which is not stored in the image forming apparatus 10 is read, the latest setting information can be acquired from the cloud server 1. Therefore, regardless of category of the sheet 600, setting information can be acquired and setting information can be set.

In addition, the image forming apparatus 10 according to the embodiment described above notifies the user that the sheet identification code 901 is to be read in response to the information regarding the replenishment of the sheet 600 in the sheet feed cassette 16 being acquired. Thus, even a user who is unfamiliar with the handling of the image forming apparatus 10 can easily perform various settings of the read/write unit 1311 and the conveyance control unit 1304 simply by reading the sheet identification code 901 in response to the notification.

In the present embodiment described above, the sheet identification information is the sheet identification code 901 included in the sheet packaging material 900. Accordingly, the user can cause the sheet identification code 901 corresponding to the sheet 600 to be used to be read by the image reading unit 150, in other words, can prevent the user from erroneously reading the sheet identification code 901 of the other sheet 600.

Second Embodiment

Next, a second embodiment will be described. In the second embodiment, description of the contents described in the above-described first embodiment will be omitted as appropriate. It is also possible to appropriately combine the second embodiment and the first embodiment described above.

In the first embodiment described above, the image forming apparatus acquires setting information from the cloud server 1. In the second embodiment, the image forming apparatus 10 acquires setting information from the memory 502.

(Functional Configuration of Image Forming Apparatus 10 According to Second Embodiment)

Figure 16:
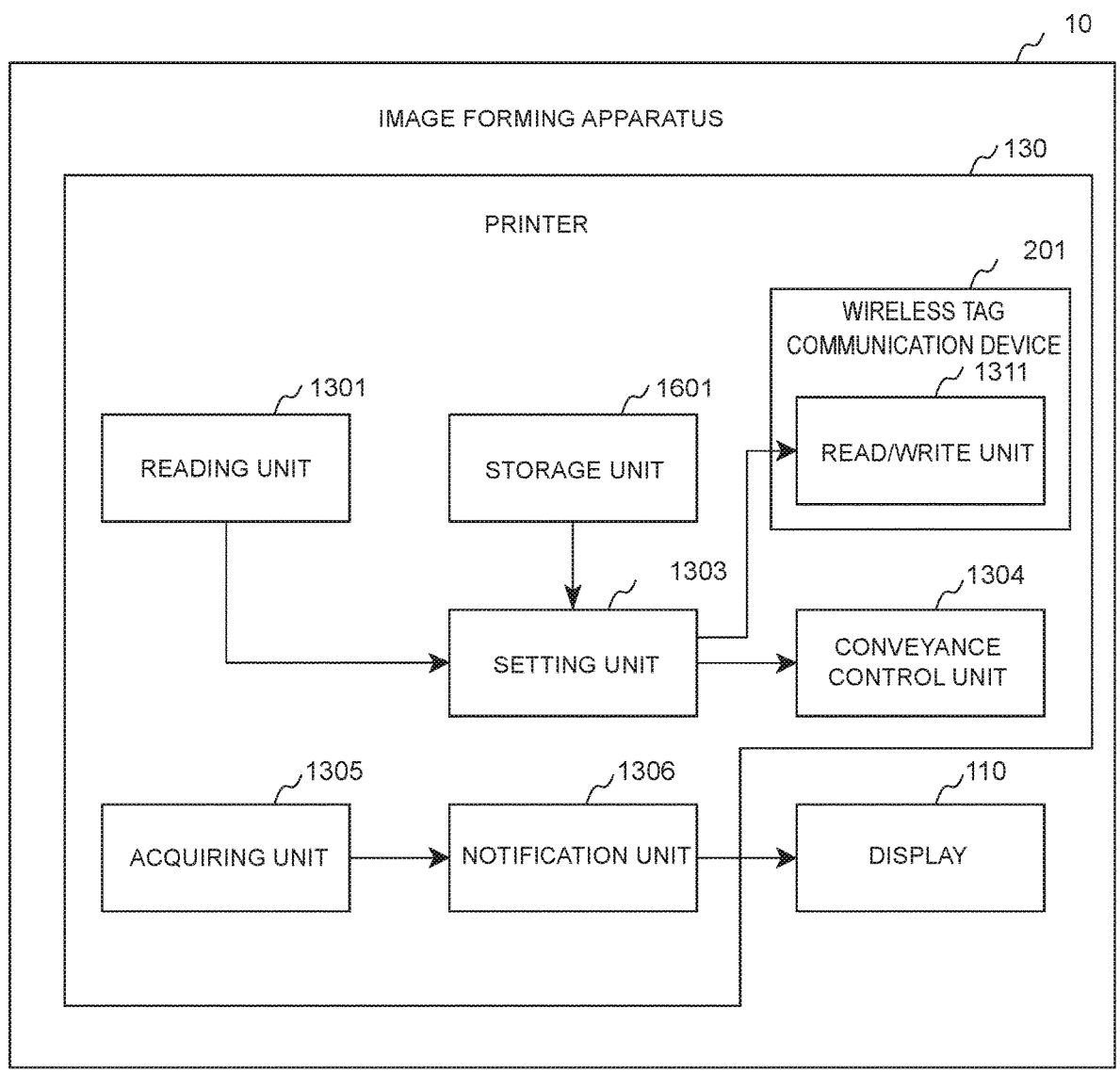
FIG. 16 is a functional block diagram of an image forming apparatus according to a second embodiment.

FIG. 16 is a functional block diagram of the image forming apparatus including the printer 130 according to the second embodiment. In FIG. 13, the printer 130 comprises a storage unit 1601. The storage unit 1601 is realized by the memory 502.

The storage unit 1601 stores setting information (i.e., parameters) corresponding to identification information (i.e., sheet identification code 901). For example, the storage unit 1601 stores a parameter DB 6 (see FIG. 12). However, the storage unit 1601 may not store model identification information among the data included in the parameter DB 6. In addition, when the sheet 600 of a single type is defined as the sheet 600 to be used in advance, the storage unit 1601 may store setting information corresponding to the sheet 600 of a single type.

The setting unit 1303 extracts a parameter corresponding to sheet identification information from the parameters stored in the storage unit 1601 based on the sheet identification information (i.e., sheet identification code 901) read by the reading unit 1301, and sets the extracted parameter to the read/write unit 1311. The setting unit 1303 also sets the extracted parameters to the conveyance control unit 1304.

(Process of Setting of Parameters Performed by Image Forming Apparatus 10 According to the Second Embodiment)

Next, a process of setting parameters performed by the image forming apparatus 10 including the printer 130 according to the second embodiment will be described with reference to FIG. 17.

Figure 17:
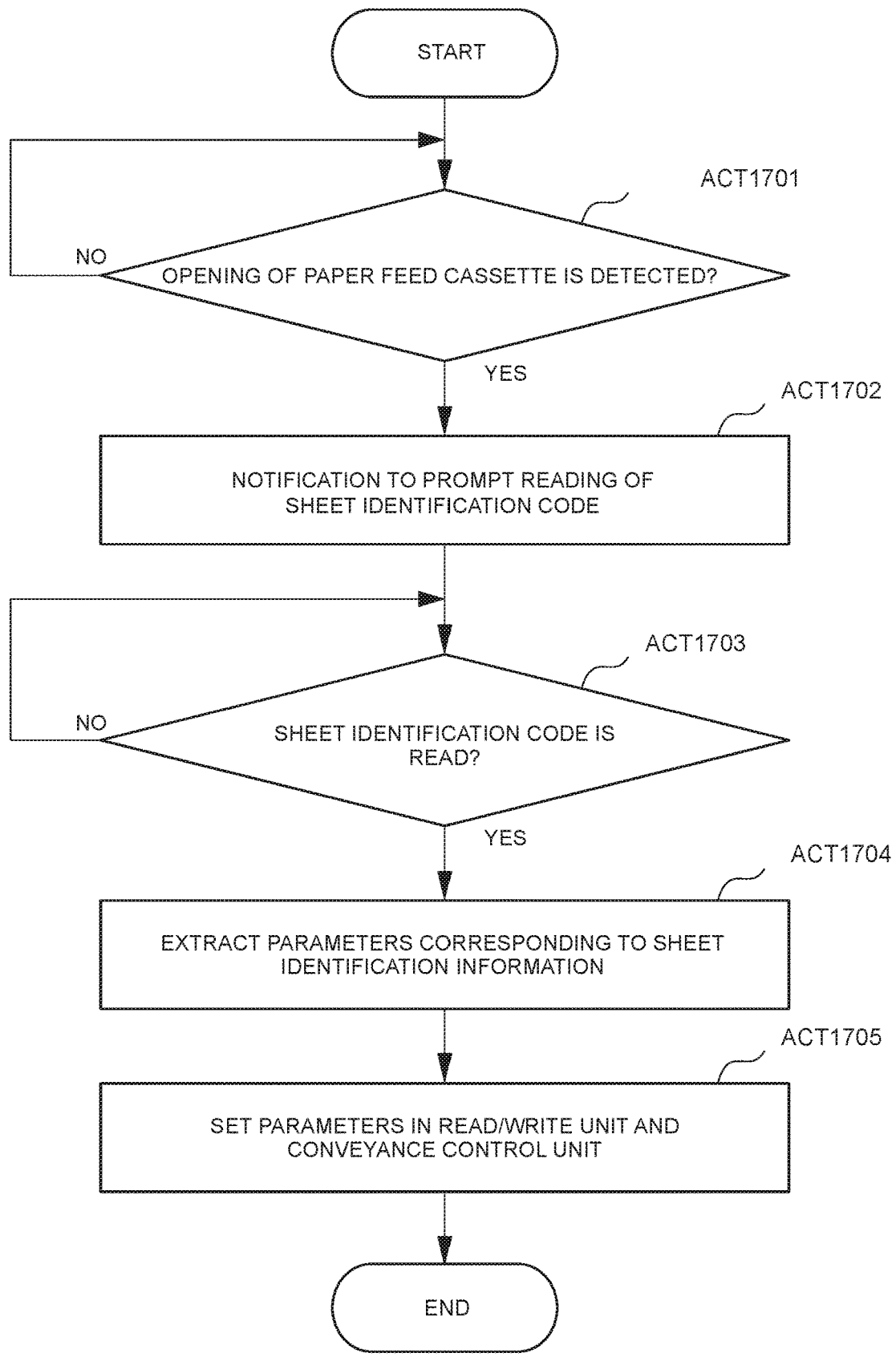
FIG. 17 is a flowchart of a process for setting parameters performed by the image forming apparatus according to a second embodiment.

FIG. 17 is a flowchart of a process for setting parameters performed by the image forming apparatus 10 according to the second embodiment.

In FIG. 17, the image forming apparatus 10 determines whether the opening of the sheet feed cassette 16 has been detected (ACT1701). The image forming apparatus 10 waits until the opening of the sheet feed cassette 16 is detected (ACT1701:NO), and when the opening of the sheet feed cassette 16 is detected (ACT1701:YES), a notification prompting the user to operate the image reading unit 150 to read the sheet identification code 901 is displayed on the display 110 (ACT1702).

Next, the image forming apparatus 10 determines whether the sheet identification code 901 has been read by the image reading unit 150 (ACT1703). The image forming apparatus 10 waits until the sheet identification code 901 is read (ACT1703:NO), and when the sheet identification code 901 is read (ACT1703:YES), extracts parameters corresponding to the sheet identification information from the parameters stored in the storage unit 1601 (ACT1704).

After extracting the parameters, the image forming apparatus 10 sets the extracted parameters in the read/write unit 1311 and the conveyance control unit 1304 (ACT1705), and ends the series of processes.

Further, the image forming apparatus 10 according to the second embodiment sets the setting information stored in the storage unit 1601 based on the sheet identification code 901. Thus, the image forming apparatus 10 can set the setting information without requesting the cloud server 1 to transmit the setting information. Therefore, for example, the setting information can be set even when the communication condition is not good.

The functions of the printer 130 in the above-described embodiment may be realized by a computer. In this case, a program for performing those functions may be recorded in a computer-readable storage medium, and the program recorded in the storage medium may be read into a computer system and executed. Here, the "computer system" includes an operating system and hardware such as a peripheral device. The "computer-readable storage medium" refers to a portable storage medium such as a Universal Serial Bus (USB) flash memory, a Solid State Drive (SSD), a flexible disk, a magneto-optical disk, or a ROM, a CD-ROM, or a hard disk built in a computer system. Further, the program may be transmitted from a server device via a network such as the Internet or a telephone line and copied to the computer as a client device. The above-described program may be for realizing a part of the above-described functions, or may be realized by combining the above-described functions with a program already recorded in a computer system.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A printer comprising:
a cassette or tray for storing a sheet to which a wireless tag is attached;
a conveyer configured to convey the sheet;
a wireless tag reader/writer;
a scanner;
a display; and
a controller configured to:
determine whether the cassette or tray is open,
upon determining that the cassette or tray is open, control the display to display a message instructing a user to operate the scanner to read a symbol,
control the scanner to read the symbol,
determine whether the symbol is an identification code that identifies a type of a sheet,
upon determining that the symbol is the identification code, acquire parameters used for controlling the conveyer or the reader/writer corresponding to the type of the sheet, and
when printing is performed on the sheet, using the parameters, control the conveyer to convey the sheet and control the reader/writer to read and write information from and to a wireless tag attached to the sheet.

2. The printer according to claim 1, wherein the controller is configured to:
transmit to a server a request for the parameters, the request including the identification code and model information that identifies a model of the printer, and
receive the parameters from the server.

3. The printer according to claim 1, further comprising:
a memory that stores the parameters in association with the identification code, wherein
the controller acquires the parameters from the memory.

4. The printer according to claim 1, wherein the symbol is a bar code printed on a package of the sheet.

5. The printer according to claim 1, wherein the parameters indicate a size and a thickness of the sheet and a conveyance speed suitable for the sheet.

6. The printer according to claim 1, wherein the parameters indicate a polarization direction and an output power of a radio wave to be emitted from the reader/writer and a received signal strength indicator (RSSI) threshold value that indicates an RSSI to be measured when the reader/writer can communicate with the wireless tag attached to the sheet conveyed for printing and cannot communicate with another wireless tag attached to another sheet stored in the cassette or on the tray.

7. The printer according to claim 1, wherein
the conveyer conveys the sheet along a conveyance path that extends along a first direction, and
the reader/writer emits toward a second direction a radio wave to read and write information from and to the wireless tag of the sheet conveyed along the conveyance path, the second direction being perpendicular to the first direction.

8. A method carried out by a printer that includes:
a cassette or tray for storing a sheet to which a wireless tag is attached,
a conveyer configured to convey the sheet,
a wireless tag reader/writer, and
a scanner, the method comprising:
determining whether the cassette or tray is open;
upon determining that the cassette or tray is open, displaying a message instructing a user to operate the scanner to read a symbol;
controlling the scanner to read the symbol;
determining whether the symbol is an identification code that identifies a type of a sheet;
upon determining that the symbol is the identification code, acquiring parameters used for controlling the conveyer or the reader/writer corresponding to the type of the sheet; and
when printing is performed on the sheet, using the parameters, controlling the conveyer to convey the sheet and controlling the reader/writer to read and write information from and to a wireless tag attached to the sheet.

9. The method according to claim 8, further comprising:
transmitting to a server a request for the parameters, the request including the identification code and model information that identifies a model of the printer, and
receiving the parameters from the server.

10. The method according to claim 8, further comprising:
storing in a memory of the printer the parameters in association with the identification code, wherein
the parameters are acquired from the memory.

11. The method according to claim 8, wherein the symbol is a bar code printed on a package of the sheet.

12. The method according to claim 8, wherein the parameters indicate a size and a thickness of the sheet and a conveyance speed suitable for the sheet.

13. The method according to claim 8, wherein the parameters indicate a polarization direction and an output power of a radio wave to be emitted from the reader/writer and a received signal strength indicator (RSSI) threshold value that indicates an RSSI to be measured when the reader/writer can communicate with the wireless tag attached to the sheet conveyed for printing and cannot communicate with another wireless tag attached to another sheet stored in the cassette or on the tray.

14. The method according to claim 8, wherein
the sheet is conveyed along a conveyance path that extends along a first direction, and
a radio wave is emitted toward a second direction to read and write information from and to the wireless tag of the sheet conveyed along the conveyance path, the second direction being perpendicular to the first direction.

15. A non-transitory computer readable medium storing a program causing a computer to execute a method comprising:
determining whether a cassette or tray of a printer is open;
upon determining that the cassette or tray is open, displaying a message instructing a user to operate a scanner to read a symbol;
reading the symbol;
determining whether the symbol is an identification code that identifies a type of a sheet to which a wireless tag is attached;
upon determining that the symbol is the identification code, acquiring parameters corresponding to the type of the sheet and used for controlling a conveyer of the printer for conveying the sheet or a wireless tag reader/writer for reading and writing information from and to the wireless tag of the sheet conveyed; and
when printing is performed on the sheet, using the parameters, controlling the conveyer to convey the sheet and controlling the reader/writer to read and write information from and to the wireless tag attached to the sheet.

16. The computer readable medium according to claim 15, wherein the method further comprises:
transmitting to a server a request for the parameters, the request including the identification code and model information that identifies a model of the printer, and
receiving the parameters from the server.

17. The computer readable medium according to claim 15, wherein
the method further comprises storing in a memory the parameters in association with the identification code, and
the parameters are acquired from the memory.

* * * * *